US009978364B2

(12) United States Patent

Kurata et al.

(10) Patent No.: US 9,978,364 B2

(45) **Date of Patent: *May 22, 2018**

(54) PRONUNCIATION ACCURACY IN SPEECH RECOGNITION

(71) Applicant: International Business Machines Corporation, Armonk, NY (US)

(72) Inventors: Gakuto Kurata, Tokyo (JP); Masafumi Nishimura, Yokohama (JP); Ryuki Tachibana, Yokohama (JP)

(73) Assignee: International Business Machines Corporation, Armonk, NY (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/082,329

(22) Filed: Mar. 28, 2016

(65) Prior Publication Data

US 2016/0210964 A1 Jul. 21, 2016

Related U.S. Application Data

(63) Continuation of application No. 14/251,786, filed on Apr. 14, 2014, now Pat. No. 9,384,730.

(30) Foreign Application Priority Data

May 30, 2013 (JP) ................................ 2013-114083

(51) Int. Cl.

*G10L 15/00* (2013.01)

*G10L 15/197* (2013.01)

(Continued)

(52) U.S. Cl.

CPC ............ *G10L 15/197* (2013.01); *G10L 15/01* (2013.01); *G10L 15/08* (2013.01); *G10L 15/187* (2013.01)

(58) Field of Classification Search

None

See application file for complete search history.

(56) References Cited

U.S. PATENT DOCUMENTS 6,393,398 B1 * 5/2002 Imai ........................ G10L 15/08 704/254

9,026,442 B2 5/2015 Ljolje et al.

(Continued)

FOREIGN PATENT DOCUMENTS

JP 08314496 A 11/1996

JP 2999727 B2 1/2000

(Continued)

OTHER PUBLICATIONS

IBM: List of IBM Patents or Patent Applications Treated as Related (Appendix P), Mar. 28, 2016, 2016, pp. 1-2.

(Continued)

*Primary Examiner* — Richa Mishra

(74) *Attorney, Agent, or Firm* — L. Jeffrey Kelly

(57) ABSTRACT

A reading accuracy-improving system includes: a reading conversion unit for retrieving a plurality of candidate word strings from speech recognition results to determine the reading of each candidate word string; a reading score calculating unit for determining the speech recognition score for each of one or more candidate word strings with the same reading to determine a reading score; and a candidate word string selection unit for selecting a candidate to output from the plurality of candidate word strings on the basis of the reading score and speech recognition score corresponding to each candidate word string.

12 Claims, 5 Drawing Sheets

| Word String | Acoustic Probability: $P_A$ | Linguistic Probability: $P_L$ | Joint Probability: $P_T = P_A P_L$ | Pronunciation |
|---|---|---|---|---|
| お/オ雛/ヒナ様/サマ | 0.000382 | 0.000158 | $6.036 * 10^{-8}$ | オヒナサマ |
| お/オひな/ヒナ様/サマ | 0.000364 | 0.000129 | $4.696 * 10^{-8}$ | |
| お/オひな/ヒナさま/サマ | 0.000377 | 0.000251 | $9.463 * 10^{-8}$ | |
| お/オ嬢/ジョウ様/サマ | 0.000230 | 0.000457 | $10.511 * 10^{-8}$ | オジョウサマ |

(51) Int. Cl.

| | |
|---|---|
| ***G10L 15/187*** | (2013.01) |
| ***G10L 15/08*** | (2006.01) |
| ***G10L 15/01*** | (2013.01) |

(56) References Cited

U.S. PATENT DOCUMENTS

| | | | | |
|---|---|---|---|---|
| 9,076,347 | B2 | 7/2015 | Komissarchik et al. | |
| 9,666,181 | B2 | 5/2017 | Krause et al. | |
| 2001/0020226 | A1 | 9/2001 | Minamino et al. | |
| 2001/0053974 | A1 | 12/2001 | Lucke et al. | |
| 2004/0167779 | A1 | 8/2004 | Lucke et al. | |
| 2005/0131674 | A1* | 6/2005 | Aizawa | G10L 13/08 704/9 |
| 2005/0228667 | A1 | 10/2005 | Duan et al. | |
| 2008/0154600 | A1 | 6/2008 | Tian et al. | |
| 2008/0221890 | A1 | 9/2008 | Kurata et al. | |
| 2008/0294437 | A1 | 11/2008 | Nakano et al. | |
| 2009/0150157 | A1* | 6/2009 | Kagoshima | G10L 13/08 704/260 |
| 2011/0106792 | A1* | 5/2011 | Robertson | G10L 15/26 707/723 |
| 2013/0041647 | A1* | 2/2013 | Ramerth | G06F 17/2863 704/2 |
| 2014/0358533 | A1 | 12/2014 | Kurata et al. | |

FOREIGN PATENT DOCUMENTS

| | | | |
|---|---|---|---|
| JP | 2004021207 | A | 1/2004 |
| JP | 3494338 | B2 | 2/2004 |
| JP | 2006337667 | A | 12/2006 |
| JP | 3948260 | B2 | 7/2007 |
| JP | 2009237336 | A * | 10/2009 |
| JP | 4543294 | B2 | 9/2010 |

OTHER PUBLICATIONS

Kurata et al., Pending U.S. Appl. No. 14/251,786, filed Apr. 14, 2014, titled “Pronunciation Accuracy in Speech Recognition,” pp. 1-29.

Japanese Application No. 2013-114083, filed May 30, 2013, entitled: “System, Method and Program for Improving Pronunciation Accuracy in Speech Recognition”.

Pending U.S. Appl. No. 14/251,786, filed Apr. 14, 2014, titled “Pronunciation Accuracy in Speech Recognition,” pp. 1-29.

* cited by examiner

FIG. 3

| Word String | Acoustic Probability: $P_A$ | Linguistic Probability: $P_L$ | Joint Probability: $P_T = P_A P_L$ | Pronunciation |
|---|---|---|---|---|
| お/オ雛/ヒナ様/サマ | 0.000382 | 0.000158 | $6.036 * 10^{-8}$ | オヒナサマ |
| お/オひな/ヒナ様/サマ | 0.000364 | 0.000129 | $4.696 * 10^{-8}$ | |
| お/オひな/ヒナさま/サマ | 0.000377 | 0.000251 | $9.463 * 10^{-8}$ | |
| お/オ嬢/ジョウ様/サマ | 0.000230 | 0.000457 | $10.511 * 10^{-8}$ | オジョウサマ |

| Word String | Pronunciation | Pronunciation Score: $P_Y$ | Mixed Score: $P_M$ |
|---|---|---|---|
| お/オ雛/ヒナ様/サマ | オヒナサマ | $(6.036+4.696+9.463)*10^{-8} = 20.195*10^{-8}$ | $13.116 * 10^{-8}$ |
| お/オひな/ヒナ様/サマ | | | $12.445 * 10^{-8}$ |
| お/オひな/ヒナさま/サマ | | | $14.829 * 10^{-8}$ |
| お/オ嬢/ジョウ様/サマ | オジョウサマ | $10.511 * 10^{-8}$ | $10.511 * 10^{-8}$ |

PRONUNCIATION ACCURACY IN SPEECH RECOGNITION

CROSS REFERENCE TO RELATED APPLICATIONS

The present application claims the benefit of priority of Japanese Patent Application Serial Number 2013-114083, filed May 30, 2013, with the Japanese Patent Office (JPO), the contents of which are herein incorporated by reference in their entirety.

FIELD OF THE INVENTION

The present invention relates to a technique for improving pronunciation accuracy in speech recognition and, more specifically, to a technique for reducing the mispronunciation rate in speech recognition results.

BACKGROUND

Research in speech recognition has yielded long-established statistical methods in which speech recognition is performed using acoustic models and linguistic models (see, for example, Patent Literature 1 through 7). In speech recognition, finding a word string W having the largest posterior probability P(W|X) with respect to the feature value X of the inputted speech has been formulated as a problem, and this is modified as shown in Equation (1) below.

$$\begin{aligned} W' &= \arg\max P(W \mid X) \\ &= \arg\max P_T(W, X) \\ &= \arg\max P_L(W) P_A(X \mid W) - (1) \end{aligned} \quad \text{Equation 1}$$

In other words, in speech recognition, the word series W' having the largest product (arg max) of the probability of occurrence $P_A$ (X|W) of the feature quantity X when the word string W is uttered and the probability of occurrence $P_L$ (W) of the word string W itself is selected as the recognition result.

Here, an acoustic model is used to determine the probability $P_A$ (X|W) of the former, and words with a high degree of probability are selected as recognition candidates. Recognition using an acoustic model is performed by matching the vocabulary to be recognized with a dictionary that defines its pronunciation. A linguistic model, more specifically, an N-gram model, is used to approximate the probability $P_L$ (W) of the former. In this method, the probability of the entire statement, that is, the word string W, is approximated from the probability of the occurrence of N consecutive word sets.

Recently, web-based text has been used and utilized in the learning of dictionaries and linguistic models. This includes innumerable words with the same pronunciation but different notations (referred to below as "homophones with different notations"). In the linguistic models of ordinary speech recognition systems, a linguistic probability is assigned to each of the notations. When there is a plurality of notations for a semantically equivalent word, the linguistic probability of the word is divided to the notations. As mentioned above, in ordinary speech recognition, the string of notations with the largest product of linguistic probability and acoustic probability is outputted. However, because the linguistic probability of the word is divided to the notations, the linguistic probability of each of the notation is lower than that of the word, and the word with the correct pronunciation often cannot be selected in speech recognition results selected by maximizing the probability product in the manner described above.

If phoneme coding is performed to perform speech recognition using phonemes as the unit of recognition rather than words, recognition results emphasizing the pronunciation can be obtained. However, the recognition accuracy is generally lower because the linguistic models used in phoneme coding are poor.

BRIEF SUMMARY

Technical Problems

In consideration of the problems existing in the above-mentioned background art, it is an object of the present invention to solve these technical problems by providing a pronunciation accuracy-improving method, pronunciation accuracy-improving system and pronunciation accuracy-improving program able to improve pronunciation accuracy in speech recognition and reduce the mispronunciation rate in speech recognition results.

Solution to Problems

In order to solve the technical problems described above, embodiments of the present invention provide a pronunciation accuracy-improving method for speech recognition including the following characteristics. The pronunciation accuracy-improving method of the present invention includes steps in which a computer: (a) reads a plurality of candidate word strings in speech recognition results; (b) determines the pronunciation of each of the plurality of candidate word strings; (c) determines the total value of the speech recognition score for each of one or more candidate word strings with the same pronunciation to determine a pronunciation score; and (d) selects a candidate among the plurality of candidate word strings to output on the basis of the pronunciation score and the speech recognition score corresponding to each candidate word string.

Preferably, step (d) includes a step in which the computer weights and adds together the speech recognition score and corresponding pronunciation score for each candidate word string to obtain a new score, and selects the candidate word string with the highest new score.

Instead of this configuration, step (d) may include a step in which the computer selects the candidate word string with the highest speech recognition score from among the one or more candidate word strings with the highest pronunciation score.

Step (c) may include a step in which the computer allows for a partial difference in pronunciations between two or more candidate word strings treated as having the same pronunciation in calculating the pronunciation score.

Preferably, a plurality of candidate word strings in the speech recognition results in step (a) are integrated with the N-best lists from a plurality of speech recognition systems.

In addition, step (d) preferably includes a step in which the computer selects all of a plurality of candidate word strings as candidates to be outputted, and rescores the candidate word strings on the basis of the speech recognition score of each candidate word string and the corresponding pronunciation score.

The present invention was described above as a pronunciation accuracy-improving method for speech recognition. However, the present invention can also be understood as a pronunciation accuracy-improving program for executing in a computer the steps in this pronunciation accuracy-improving method, and as a pronunciation accuracy-improving system realized by installing this pronunciation accuracy-improving program on a computer.

Effect of Invention

In the present invention, the speech recognition results are converted to pronunciations, and the probability of the pronunciation is determined by totaling the probability of speech recognition results sharing a pronunciation to select the outputted word string. As a result, notation fluctuations in linguistic models and the corpora used in linguistic model learning can be absorbed, and speech recognition results with the correct pronunciation are more likely to be outputted. Also, unlike phoneme decoding performed at the beginning, high recognition accuracy is obtained because speech recognition using linguistic models with word units can be used to provide context. Furthermore, because only the probability of homophones with different notation appearing in a similar context is added, the probability of homophones with different notation which have the same pronunciation but are used in different contexts is not added. Other advantageous effects of the present invention will become clear in the description of each embodiment.

BRIEF DESCRIPTION OF THE SEVERAL VIEWS OF THE DRAWINGS

FIG. 3 shows the recognition results of an utterance in which homophones with different notations appear as output candidates.

DETAILED DESCRIPTION

The following is an explanation of the present invention with reference to an embodiment of the present invention. However, the present embodiment does not limit the present invention as in the scope of the claims. Also, all combinations of characteristics explained in the embodiment are not necessarily required in the technical solution of the present invention. In the entire explanation of the embodiment, identical elements are denoted by the same numbers.

Figure 1:
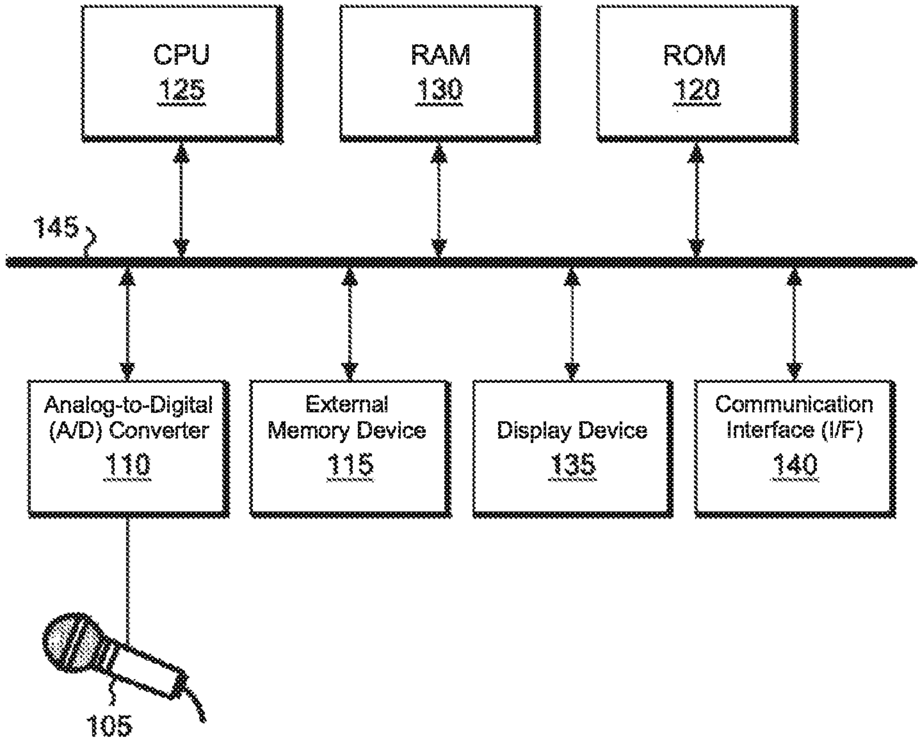
FIG. 1 is an example of a suitable hardware configuration for a computer used to realize a pronunciation accuracy-improving system in an embodiment of the present invention.

FIG. 1 is an example of a typical hardware configuration for a computer 100 used to embody the present invention. In FIG. 1, sounds generated in the vicinity of a microphone 105 are received by the microphone 105 as analog signals, and are inputted to an analog-to-digital (A/D) converter 110 for conversion to digital signals that can be processed by the CPU 125.

An external memory device 115 and ROM 120 work with an operating system so that instructions can be issued to the CPU 125, and code and various types of data for computer programs such as a pronunciation accuracy-improving program module used to embody the present invention can be recorded. The computer programs stored in the external storage device 115 and the ROM 120 are loaded into RAM 130 and executed by the CPU 125. The external memory device 115 is connected to a bus 145 via a controller (not shown) such as a SCSI controller. The computer programs can be compressed or divided into a plurality of sections and stored in a plurality of media.

The computer 100 also includes a display device 135 for presenting visual data to the user. The display device 135 is connected to the bus 145 via a graphics controller (not shown). The computer 100 is connected to a network via the communication interface 140 in order to be able to communicate with other computers.

The constituent elements explained above are for illustrative purposes only, and not all of these constituent elements are essential constituent elements of the present invention. Similarly, the computer 100 used to embody the present invention may include other constituent elements such as speakers, and input devices such as a keyboard and a mouse.

From the above explanation, it should be clear that the computer 100 can be an ordinary information processing device such as a personal computer, workstation or mainframe, or any combination of these.

Figure 2:
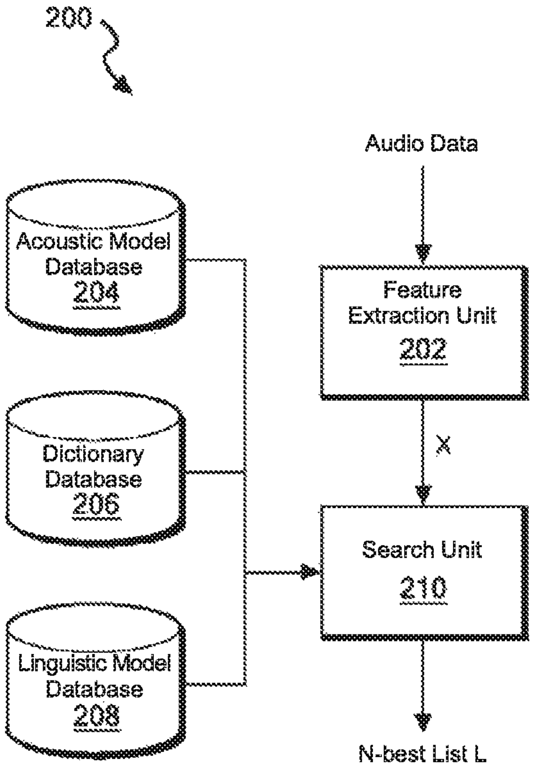
FIG. 2 is an example of function blocks in a typical speech recognition system of the prior art.

FIG. 2 is an example of the configuration of a speech recognition system 200 of the prior art. Audio data converted to digital signals by the A/D converter 110 is inputted to a feature extraction unit 202. The feature extraction unit 202 performs frame-by-frame acoustic processing such as Fourier transform and filtering on the audio data from the A/D converter 110 to extract feature values C such as Mel-frequency cepstral coefficients (MFCC) and output to a search unit 210. The feature extraction unit 202 can extract feature values X such as spectra, linear predictive coefficients, cepstral coefficients, and line spectrum pairs.

The search unit 210 uses feature values X from the feature extraction unit 202 while referencing, if necessary, an acoustic model database 204, dictionary database 206, and linguistic model database 208 to perform speech recognition on the inputted speech on the basis of, for example, a continuous distribution Hidden Markov Model (HMM).

Here, the acoustic model database 204 stores acoustic models in which acoustic feature time series have been statistically modeled. HMM is used in the modeling.

The dictionary database 206 stores dictionaries in which each word that is an object of speech recognition is described by information related to pronunciation (phonological information). To use a Japanese language dictionary as an example, the words in the dictionary appear as pairs of kana/kanji mixed notation and phoneme strings (for example, 京都/ky,o,u,t,o). The words in the dictionary may also appear as a phoneme string and a kana string (pronunciation) linked to kana/kanji mixed notation (for example, 京都/ky,o,u,t,o/キヨウト). Therefore, it should be noted that the search unit 210 described below searches notation and phoneme sequence sets, and does not convert to word notation after first determining the pronunciation of words.

The linguistic model database 208 stores linguistic models which define the constraints and likelihoods related to a chain of words. For example, the linguistic model may be based on grammatical rules or an N-gram model.

The search unit 210 integrates these models to find a word string hypothesis with the greatest observed likelihood for the feature value X of a time series outputted by the feature extraction unit 202. More specifically, the search unit 210 determines the final word string W to be outputted on the basis of a final score (referred to below as the "speech recognition score") obtained from a comprehensive evaluation of the acoustic probability provided by the acoustic model and the linguistic probability provided by the linguistic model. In the embodiment of the present invention described below, the search unit 210 outputs a list of the word strings W with the top N speech recognition scores as an N-best list L.

In a practical speech recognition system, the dictionaries and linguistic models described above may be able to handle a large vocabulary. When web-based text is used in the learning of dictionaries and linguistic models, it contains innumerable homophones with different notation. To use the Japanese language as an example, the notation for words with the same pronunciation may include a mixture of hiragana/katakana notation, kanji notation, and alphabetical notation. Another example is personal names. Many compound words also divide differently into simpler words (example: (notation/pronunciation): 京都府/キョウトフ, 京都/キョウト, 府/フ). Homophones with different notation are also found in languages other than Japanese, such as in Korean, where the same word can be written using kanji notation or hangul notation. Mixed notation with the same pronunciation appears in other languages in the form of loanwords, numerical representation, and upper- and lower-case notation (example of loanword (notation): IBM, アイビーエム; example of numerical representation (notation): 13, thirteen; example of upper- and lower-case notation: STOP, Stop, stop).

Because linguistic probability is usually assigned to a notation in linguistic models, when there is a plurality of notations for a semantically equivalent word, the linguistic probability of the word is assigned to a plurality of notations and modeled. In a typical speech recognition system 200, as described above, the final word string to be outputted is determined on the basis of a speech recognition score obtained through a comprehensive evaluation of acoustic probability and linguistic probability. However, when linguistic probability is divided among a plurality of notations in the case of a homophone with different notation, the linguistic probability of each notation is lowered, and a word with the proper pronunciation cannot be selected using a method based on a conventional speech recognition score. This will be explained with reference to the example shown in FIG. 3.

The following homophones with different notations are present in a dictionary stored in the dictionary database 206.

雛/ヒナ, ひな/ヒナ, ヒナ/ヒナ (notation/pronunciation)

Three homophones with different notations appear in the recognition results for an utterance (pronunciation: 「オヒナサマ」) as shown in FIG. 3: 「お雛様」, 「おひな様」, and 「おひなさま」.

When the comprehensive evaluation method used by the search unit 210 is based on acoustic probability and linguistic probability and the highest joint probability PT is obtained as the product of the acoustic probability $P_A$ and the linguistic probability $P_L$ as expressed by Equation (1) above, the search unit 210 outputs 「お嬢様」, which has a joint probability of PT=10.511*10−8. The word string 「オヒナサマ」 with the correct pronunciation is not selected because there are multiple notations for the pronunciation 「オヒナサマ」 and the linguistic probability $P_L$ per notation is low.

When the user of the speech recognition system 200 utters 「オヒナサマ」, obtaining 「お嬢様」 might be expected as a recognition result. Even when 「おひなさま」 or 「おひな様」 is outputted, it may be acceptable to the user. However, when 「お嬢様」 is outputted, the recognition result has to be manually corrected. A speech recognition system 200 should output one of the 「オヒナサマ」 homophones with an emphasis on the reading.

Because there is no choice but to add vocabulary to the dictionary semi-automatically, homophones with different notation cannot be managed manually. It is also impossible to classify homophones with different notations automatically by meaning. Prior to focusing on the use of web-based text in learning, the quality of corpora and dictionaries was managed manually, homophones with different notation were identified beforehand manually, and corpora and dictionaries with unified rules were used. Therefore, this problem did not occur.

In order to address this problem, the present invention introduces a new reading score. The reading score is obtained by converting speech recognition results to readings, totaling the probability of speech recognition results sharing a reading, and using this total in selecting a word string to output. In the case of the Japanese language, phoneme strings or kana strings can be used to handle the readings. In the case of the Korean language, phoneme strings or hangul strings can be used to handle the readings. In the case of other languages, phoneme strings can be used to handle the readings. It is important to note that the present invention can be applied to any language. The following is an explanation of a reading accuracy-improving system 400 according to the present invention with reference to FIG. 4.

Figures 4, 5:
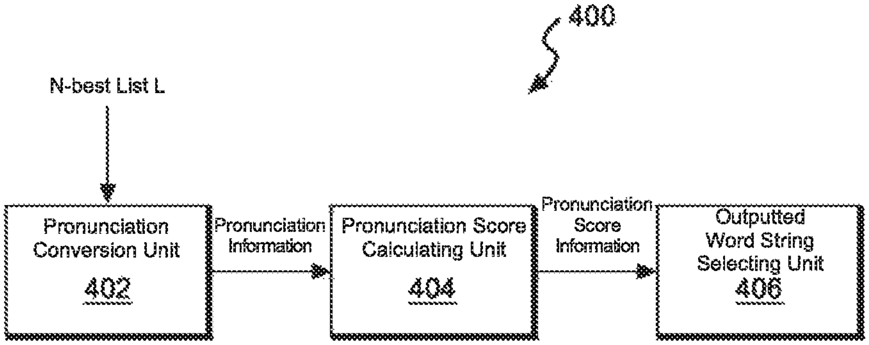
FIG. 4 is a function block diagram of a pronunciation accuracy-improving system in an embodiment of the present invention.
FIG. 5 shows the pronunciation scores and mixed scores calculated for the recognition results shown in FIG. 3.

FIG. 4 is a function block diagram of the reading accuracy-improving system 400 according to an embodiment of the present invention. This reading accuracy-improving system 400 includes a reading conversion unit 402, a reading score calculating unit 404, and an outputted word string selecting unit 406.

The reading conversion unit 402 receives an N-best list L as speech recognition results from the speech recognition system 200, and determines the reading for each listed candidate word string W. In every speech recognition system 200 and in every language, as mentioned above, the dictionaries stored in the dictionary database 206 register each word as a word notation and phoneme string pair. Therefore, when these phoneme strings are used as readings, the reading conversion unit 402 can determine a reading from a dictionary using the word notation in the speech recognition results as the key. Also, if the language is limited to Japanese, a kana string can be used instead of a phoneme string to handle the reading. Because there is a one-to-one correspondence between phoneme strings and katakana (or hiragana), the reading conversion unit 402 can use a table to convert from phoneme strings to katakana. When, as mentioned above, a dictionary records each word as a word notation, a phoneme string and a kana string (reading) set, and the phoneme string is used to handle the reading, the reading conversion unit 402 can determine the reading from a dictionary using the word notation in the speech recognition results as the key. When each candidate word string W in an N-best list L is listed with both a reading and a speech recognition score, the reading conversion unit 402 can extract the reading of each candidate word string W from the N-best list L. The speech recognition score in this example can be determined from the joint probability PT (W, X) which is obtained as the product of the acoustic probability PA and the linguistic probability PL.

The reading score calculating unit 404 receives reading information and speech recognition score information for each candidate word string W from the reading conversion unit 402, determines the total value PY(Y, X) of the speech recognition score PT (W, X) of the candidate word strings W for each of one or more candidate word strings W with the same reading Y, and uses this as the reading score for the one or more candidate word strings W with the same reading. The reading score PY (Y, X) is expressed by using the following equation.

$$P_Y(Y,X)=\Sigma_{\{Yomi(W)=Y\}}P_T(W,X)-(2) \qquad \text{Equation 2}$$

Here, Yomi(W) is a function returning the reading of word W.

Instead of using this reading score PY (Y, X) calculating method, the reading score calculating unit 404 may calculate the reading score PY (Y, X) in Equation 2 using the same reading for two or more candidate word strings with partial tolerable differences in reading. In this case, a conversion table is prepared for strings to be treated as having the same reading. The reading score calculating unit 404 determines whether or not some of a reading string listed in the N-best list L matches an entry in the conversion table. If there is a match, a portion of the reading string is converted in accordance with the conversion table, and the converted reading string is verified as being identical to a reading string on the N-best list L.

The following are specific examples (notation/reading) of reading strings that are considered to be identical.

京都/キヨウト, 京都/キョート

いう/イウ, 言う/ユウ

In the case of the notation「京都」, there are two entries for the single notation「京都」. One of these entries is the reading「キヨウト」and the phoneme string "ky, o, u, t, o", and the other entry is the reading「キョート」and the phoneme string "ky, o, o:, t, o".

The outputted word string selecting unit 406 receives the reading score information and speech recognition score information for each candidate word string W from the reading score calculating unit 404, and selects the final candidate to be outputted from the candidate word strings W on the basis of the speech recognition score PT (W, X) and the reading score PY (Yomi(W), X). The following is an explanation of two selection methods.

In the first selection method, the outputted word string selecting unit 406 may weight and add together the speech recognition score PT (W, X) and corresponding reading score PY (Yomi(W), X) for each candidate word string W using weight α to obtain a new score (referred to below as the "mixed score") PM(W, X), and select the candidate word string W with the highest mixed score PM(W, X). The mixed score PM (W, X) is expressed by the following equation.

$$P_M(W,X)=\alpha P_T(W,X)+(1-\alpha)P_Y(Yomi(W),X) \qquad \text{Equation 3}$$

In this equation, the weight α is preferably an optimum value determined beforehand in testing.

The following is a detailed explanation of the method used to calculate the mixed score PM (W, X) with reference to FIG. 5. The calculation results in FIG. 5 are inputted as the speech recognition results shown in FIG. 3 or are obtained using the value 0.5 as a weight α. Because the candidate word strings「お雛様」,「おひな様」and おひなさま」all have the same reading「オヒナサマ」, the speech recognition scores PT of the three candidate word strings are added together to obtain the reading score PY=20.195*10−8. Because there are no word strings with the reading「オジョウサマ」other than the word string「お嬢様」, the speech recognition score PT of 10.511*10−8 is also used as the reading score PY.

The mixed score PM for each of these candidate strings is calculated using Equation (3). Because the candidate word string「お雛様」has a speech recognition score of PT=6.03*10−8 (see the table in FIG. 3) and a mixed score of PY=20.195*10−8, these scores are weighted with the value 0.5 and added together to obtain a mixed score of PM=13.116*10−8. The mixed scores PM of the other candidate word strings are determined in the same way. As a result, the candidate word string「おひなさま」is outputted in this example because it has the highest mixed score PM.

The outputted word string selecting unit 406 may also use a second selection method in which the candidate word string W with the highest speech recognition score PT (W, X) is selected from among one or more candidate word strings W with the highest reading score PY (Yomi(W), X). The following is a more detailed explanation of this selection method with reference to FIG. 5. Because the reading score for「オヒナサマ」is greater than that of「オジョウサマ」, the candidate string with the highest speech recognition score PT is selected from among the candidate word strings with the reading「オヒナサマ」. Then, because the speech recognition score PT of「おひなさま」is the highest, as shown in FIG. 3, the word candidate string「おひなさま」is selected and outputted in this example.

In this example, the results of the first selection method and the second selection method are the same, but the methods do not always yield the same result. When the object of speech recognition is a short sentence, it has been determined in testing that the second selection method is better than the first selection method with respect to the misreading rate, but that the first selection method is better than the second selection method in terms of the character error rate.

Figure 6:
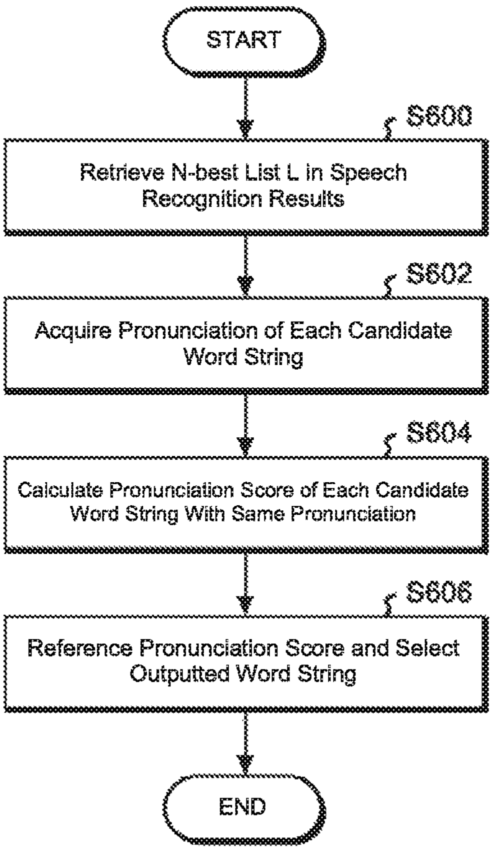
FIG. 6 is a flowchart showing an example of the operations performed in the pronunciation accuracy-improving process according to an embodiment of the present invention.

The following is an explanation of the steps performed in the reading accuracy-improving process of the present invention in this embodiment with reference to FIG. 6. The process begins in Step 600, and the reading conversion unit 402 retrieves an N-best list L as the speech recognition results. Next, the reading conversion unit 402 determines the reading for each candidate word string listed on the N-best list L (Step 602).

Then, the reading score calculating unit 404 receives the reading information for each candidate word string from the reading conversion unit 402, and calculates the reading score for each of one or more candidate word strings with the same reading on the basis of Equation (2) (Step 604). Next, the candidate word string selecting unit 406 receives the reading score for each candidate word string from the reading score calculating unit 404, and the final candidate word string is selected from among the candidate word strings listed in the N-best list L based on the speech recognition score and reading score (Step 606). The selection of the candidate word string to output may be performed using the first selection method or the second selection method described above. The process is then ended.

The present invention was explained above using an embodiment, but the technical scope of the present invention is not restricted to the description of this embodiment. It should be clear to a person of skill in the art that various modifications and improvements can be applied to the embodiment. For example, the speech recognition results inputted to the reading conversion unit 402 of the reading accuracy-improving system 400 may be simply an N-best list outputted by a single speech recognition system 200 or a combination of N-best lists from a plurality of speech recognition systems 200. Also, the outputted word string selecting unit 406 in the reading accuracy-improving system 400 may select a single candidate word string to output on the basis of the speech recognition score and reading score, or can select all of the candidate word strings on an N-best list as candidates to be outputted, each of these word candidates then being rescored on the basis of speech recognition scores and reading scores. These modifications and improvements are clearly included within the technical scope of the present invention.

The present invention is effective in the creation of learning data for an acoustic model. Speeches and transcripts (texts) are required in the speech corpora used in the learning of speech recognition acoustic models. Transcripts have to be prepared manually, and this is expensive. Automatic speech recognition is used in the preparation of learning corpora and the learning of acoustic models, but this demands a high degree of reading accuracy in the speech recognition results. If the present invention is applied to speech recognition results, speech recognition results with a high degree of reading accuracy are obtained.

The order of execution for operations, steps and processes in the devices, systems, programs and methods described in the claims, description and drawings was described using such terms as "previous" and "prior". However, these operations, steps and processes can be realized in any order as long as the output of a previous process is used by a subsequent process. Also, even when the output of a previous process is used by a subsequent process, there may be situations in which another process is inserted between the previous process and the subsequent process. Furthermore, even when another process is inserted there between, modifications may be performed in which the previous process is performed immediately prior to the subsequent process. The operational flow in the claims, description and drawing were explained using terms such as "first," "next" and "then" for the sake of convenience. However, the operational flow does not necessarily have to be executed in this order.

What is claimed is:

1. A method for improving reading accuracy in speech recognition using processing by a computer, the method comprising computer-executed steps of:

program instructions to obtain a plurality of candidate word strings from speech recognition results, wherein the speech recognition results contain a speech recognition score for each of the plurality of candidate work strings;

program instructions to determine a reading of each of the plurality of candidate word strings, wherein two or more candidate word strings have the same reading, and wherein the two or more candidate word strings having the same reading are homophones;

program instructions to determine a reading score for each candidate word string, wherein the reading score for each of the two or more candidate word strings with the same reading is based on a total value of the speech recognition scores for the two or more candidate word strings with the same reading, wherein determining the total value of the speech recognition scores for the two or more candidate word strings with the same reading includes computer-executed steps of:

program instructions to determine two or more candidate word strings with partial tolerable different readings allowing for a partial difference in readings between two or more candidate word strings treated as having the same reading, partial tolerable different readings being a first predetermined value, the partial difference in readings range being a predetermined range of values; and program instructions to calculate the reading score total value of the speech recognition scores for the two or more candidate word strings with the same reading wherein the speech recognition scores for the two or more candidate word strings with partial tolerable different readings are to be treated as having the same reading, wherein calculating the reading score total value of the speech recognition scores for the two or more candidate word strings with the same reading includes:

program instructions to receive a conversion table, wherein the conversion table includes word strings, wherein the word strings includes word notations and phoneme strings, and wherein the conversion table contains word strings with partial tolerable different readings allowing for a partial difference in readings between two or more candidate word strings treated as having the same reading, and wherein determining the two or more candidate word strings with partial tolerable different readings allowing for a partial difference in readings between two or more candidate word strings treated as having the same reading is based on the conversion table;

program instructions to receive N-best lists from a plurality of speech recognition systems, wherein the N-best lists contain the two or more candidate word strings;

program instructions to determine a match of the two or more candidate word strings within the N-best list and the conversion table of; and program instructions to convert the matched of the two or more candidate word strings according to the conversion table; and program instructions to select a candidate among the plurality of candidate word strings to output on the basis of the reading score and the speech recognition score corresponding to each word string, wherein program instructions to select the candidate includes a computer system-executed step selected from the group consisting of:

program instructions to weight and add together the speech recognition score and the corresponding reading score for each candidate word string to obtain a new score, and program instructions to select the candidate word string with the highest new score; and program instructions to select a candidate word string with the highest speech recognition score from among the one or more candidate word strings with the highest reading score.

2. The method for improving reading accuracy according to claim 1, wherein the homophones are homophones with different notations.

3. The method for improving reading accuracy according to claim 1, wherein the plurality of candidate word strings in the speech recognition results are integrated with N-best lists from a plurality of speech recognition systems.

4. The method for improving reading accuracy according to claim 1, wherein selecting a candidate includes the computer-executed step of selecting all of a plurality of candidate word strings as candidates to be outputted, and re-scoring the candidate word strings on the basis of the speech recognition score of each candidate word string and the corresponding reading score.

5. A computer program product for improving reading accuracy in speech recognition, the computer program product comprising:

one or more non-transitory computer-readable storage media and program instructions stored on the one or more computer-readable storage media, the program instructions comprising:

program instructions to obtain a plurality of candidate word strings from speech recognition results, wherein the speech recognition results contain a speech recognition score for each of the plurality of candidate work strings;

program instructions to determine a reading of each of the plurality of candidate word strings, wherein two or more candidate word strings have the same reading, and wherein the two or more candidate word strings having the same reading are homophones;

program instructions to determine a reading score for each candidate word string, wherein the reading score for each of the two or more candidate word strings with the same reading is based on a total value of the speech recognition scores for the two or more candidate word strings with the same reading, wherein determining the total value of the speech recognition scores for the two or more candidate word strings with the same reading includes computer-executed step steps of:

program instructions to determine two or more candidate word strings with partial tolerable different readings allowing for a partial difference in readings between two or more candidate word strings treated as having the same reading, partial tolerable different readings being a first predetermined value, the partial difference in readings range being a predetermined range of values; and program instructions to calculate the reading score total value of the speech recognition scores for the two or more candidate word strings with the same reading wherein the speech recognition scores for the two or more candidate word strings with partial tolerable different readings are to be treated as having the same reading, wherein calculating the reading score total value of the speech recognition scores for the two or more candidate word strings with the same reading includes:

program instructions to receive a conversion table, wherein the conversion table includes word strings, wherein the word strings includes word notations and phoneme strings, and wherein the conversion table contains word strings with partial tolerable different readings allowing for a partial difference in readings between two or more candidate word strings treated as having the same reading, and wherein determining the two or more candidate word strings with partial tolerable different readings allowing for a partial difference in readings between two or more candidate word strings treated as having the same reading is based on the conversion table;

program instructions to receive N-best lists from a plurality of speech recognition systems, wherein the N-best lists contain the two or more candidate word strings;

program instructions to determine a match of the two or more candidate word strings within the N-best list and the conversion table of; and program instructions to convert the matched of the two or more candidate word strings according to the conversion table; and program instructions to select a candidate among the plurality of candidate word strings to output on the basis of the reading score and the speech recognition score corresponding to each word string, wherein program instructions to select the candidate includes a computer program product-executed step selected from the group consisting of:

program instructions to weight and add together the speech recognition score and the corresponding reading score for each candidate word string to obtain a new score, and program instructions to select the candidate word string with the highest new score; and program instructions to select a candidate word string with the highest speech recognition score from among the one or more candidate word strings with the highest reading score.

6. The computer program product according to claim 5, wherein the homophones are homophones with different notations.

7. The computer program product according to claim 5, wherein the plurality of candidate word strings in the speech recognition results are integrated with N-best lists from a plurality of speech recognition systems.

8. The computer program product according to claim 5, wherein program instructions to select a candidate includes the computer program product-executed step of program instructions to select all of a plurality of candidate word strings as candidates to be outputted, and program instructions to re-score the candidate word strings on the basis of the speech recognition score of each candidate word string and the corresponding reading score.

9. A computer system for improving reading accuracy in speech recognition, the computer system comprising:

one or more computer processors;

one or more computer-readable storage media;

program instructions stored on the computer-readable storage media for execution by at least one of the one or more processors, the program instructions comprising:

program instructions to obtain a plurality of candidate word strings from speech recognition results, wherein the speech recognition results contain a speech recognition score for each of the plurality of candidate work strings;

program instructions to determine a reading of each of the plurality of candidate word strings, wherein two or more candidate word strings have the same reading, and wherein the two or more candidate word strings having the same reading are homophones;

program instructions to determine a reading score for each candidate word string, wherein the reading score for each of the two or more candidate word strings with the same reading is based on a total value of the speech recognition scores for the two or more candidate word strings with the same reading, wherein determining the total value of the speech recognition scores for the two or more candidate word strings with the same reading includes computer-executed step steps of:

program instructions to determine two or more candidate word strings with partial tolerable different readings allowing for a partial difference in readings between two or more candidate word strings treated as having the same reading, partial tolerable different readings being a first predetermined value, the partial difference in readings range being a predetermined range of values; and program instructions to calculate the reading score total value of the speech recognition scores for the two or more candidate word strings with the same reading wherein the speech recognition scores for the two or more candidate word strings with partial tolerable different readings are to be treated as having the same reading, wherein calculating the reading score total value of the speech recognition scores for the two or more candidate word strings with the same reading includes:

program instructions to receive a conversion table, wherein the conversion table includes word strings, wherein the word strings includes word notations and phoneme strings, and wherein the conversion table contains word strings with partial tolerable different readings allowing for a partial difference in readings between two or more candidate word strings treated as having the same reading, and wherein determining the two or more candidate word strings with partial tolerable different readings allowing for a partial difference in readings between two or more candidate word strings treated as having the same reading is based on the conversion table;

program instructions to receive N-best lists from a plurality of speech recognition systems, wherein the N-best lists contain the two or more candidate word strings;

program instructions to determine a match of the two or more candidate word strings within the N-best list and the conversion table of; and program instructions to convert the matched of the two or more candidate word strings according to the conversion table; and program instructions to select a candidate among the plurality of candidate word strings to output on the basis of the reading score and the speech recognition score corresponding to each word string, wherein program instructions to select the candidate includes a computer system-executed step selected from the group consisting of:

program instructions to weight and add together the speech recognition score and the corresponding reading score for each candidate word string to obtain a new score, and program instructions to select the candidate word string with the highest new score; and program instructions to select a candidate word string with the highest speech recognition score from among the one or more candidate word strings with the highest reading score.

10. The system according to claim 9, wherein the homophones are homophones with different notations.

11. The system according to claim 9, wherein the plurality of candidate word strings in the speech recognition results are integrated with N-best lists from a plurality of speech recognition systems.

12. The system according to claim 9, wherein program instructions to select a candidate includes the computer system-executed step of program instructions to select all of a plurality of candidate word strings as candidates to be outputted, and program instructions to re-score the candidate word strings on the basis of the speech recognition score of each candidate word string and the corresponding reading score.

* * * * *